US006284373B1

(12) United States Patent
Ream et al.

(10) Patent No.: US 6,284,373 B1
(45) Date of Patent: Sep. 4, 2001

(54) ELECTROSTATIC FUSER ROLLS AND BELTS

(75) Inventors: Gregory L. Ream; Ronald L. Roe; Bradley L. Beach, all of Lexington; Steven A. Curry, Nicholasville, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/393,571

(22) Filed: Sep. 10, 1999

(51) Int. Cl.[7] ................................ B32B 15/00; B25F 5/00

(52) U.S. Cl. .......................... 428/379; 428/383; 428/372; 428/392; 492/48; 492/49; 492/56; 252/500; 252/511

(58) Field of Search .................................... 428/379, 383, 428/372, 392; 492/48, 49, 56; 252/500, 511

(56) References Cited

U.S. PATENT DOCUMENTS

| | | | |
|---|---|---|---|
| 4,179,601 | 12/1979 | Tarumi et al. | 219/216 |
| 4,434,355 | 2/1984 | Inagaki et al. | 219/216 |
| 4,550,243 | 10/1985 | Inagaki | 219/216 |
| 4,596,920 | 6/1986 | Inagaki | 219/216 |
| 5,045,891 | 9/1991 | Senba et al. | 355/289 |
| 5,319,427 * | 6/1994 | Sakurai et al. | 355/285 |
| 5,960,245 | 9/1998 | Chen et al. . | |

* cited by examiner

*Primary Examiner*—Cynthia H. Kelly
*Assistant Examiner*—Ling Xu
(74) *Attorney, Agent, or Firm*—John A. Brady

(57) ABSTRACT

Heat rolls and fuser belts utilized in the fusing step of the electrophotographic process are disclosed. These belts and rollers eliminate toner offset while still maintaining excellent release characteristics of the printed page from the fuser. The heat rolls comprise a core member having coated thereon a plurality of concentric layers, wherein at least one of said layers (preferably the top layer) does not contain electrically conductive materials and wherein the roll exhibits its electrical breakdown at about 250 volts or less. The fuser belts comprise a heat resistant resin substrate (such as a polyimide belt) carrying thereon a plurality of layers coating the outer surface of said belt, wherein at least one of said layers (preferably the top layer) does not contain electrically conductive materials and wherein the belt exhibits electrical breakdown at about 250 volts or less.

7 Claims, 2 Drawing Sheets

ELECTROSTATIC FUSER ROLLS AND BELTS

TECHNICAL FIELD

This invention relates to electrophotographic processes and, particularly, to hot rolls and belts used in the fusing step of such processes.

BACKGROUND OF THE INVENTION

In electrophotography, a latent image is created on the surface of an insulating, photoconducting material by selectively exposing an area of the surface to light. A difference in electrostatic charge density is created between the areas on the surface exposed and those unexposed to the light. The latent electrostatic image is developed into a visible image by electrostatic toners containing pigment components and thermoplastic components. The toners, which may be liquids or powders, are selectively attracted to the photoconductor's surface, either exposed or unexposed to light, depending upon the relative electrostatic charges on the photoconductor's surface, development electrode, and the toner. The photoconductor may be either positively or negatively charged, and the toner system similarly may contain negatively or positively charged particles.

A sheet of paper or intermediate transfer medium is given an electrostatic charge opposite that of the toner and then passed close to the photoconductor's surface, pulling the toner from the photoconductor surface onto the paper or intermediate medium still in the pattern of the image developed from the photoconductor surface. A set of fuser rollers or belts, under heat, melts and fixes the toner in the paper, subsequent to direct transfer or indirect transfer when an intermediate transfer medium is used, producing the printed image.

The electrostatic printing process, therefore, comprises an ongoing series of steps in which the photoconductor surface is charged and discharged as the printing takes place. In addition, during the process, various charges are formed on the photoconductor surface, the toner and the paper surface to enable the printing process to take place. Having the appropriate charges in the appropriate places at the appropriate times is what makes the process work.

Contamination of print media arises in electrophotographic printers and copiers as a result of charge accumulation on the fuser hot roll or belt and the pressure roll. This contamination results from the offset of toner from the print media onto the contacting fuser hot roll or belt due to unfavorable electrostatic fields in and around the fusing nip (i.e., the nip formed between the fuser roll or belt and the pressure roll). This contamination ("toner offset") results in a printed page of poor quality, generally characterized by the appearance of undesired white lines followed by toner debris after one additional revolution of the fuser hot roll or belt.

Prior solutions to this problem focus on controlling the resistance of the coating on the fuser hot roll or belt in combination with underlying electrodes which may be grounded or tied to a bias source. Using such an approach, a fuser hot roll has a conductive (typically metal) core with one or more fluoropolymer coatings which may be loaded with electrically conductive particles in addition to thermally conductive or reinforcing particles. Similarly, a fuser film belt would have a high tensile modulus substrate layer (typically a polyimide layer) loaded with thermally conductive particles (typically boron nitride), a conductive primer layer (e.g., carbon black loaded fluoropolymer), and an outer layer which is made resistive by the addition of conductive particles (such as carbon black) or ionic conductive additives to a fluoropolymer resin. In an alternative approach, the pressure roll may be comprised of materials which limit build-up of surface charge and make it usable as an electrode. Using this approach, a metal core or shaft would be covered with a compressible rubber material that is loaded with carbon black to make it resistive. A fluoropolymer is applied to form a surface layer on the pressure roll which is rendered resistive by the addition of carbon black or an ionic conductive agent. The resistive nature of these coatings bleeds off the surface charge. Examples of this approach are described in the patents cited below. The problem with this approach is that it requires particulate materials, such as carbon black, in each of the layers on the fuser roll or belt, or pressure roll, particularly in the outer layer (i.e., the layer which comes in contact with the printed page), which renders release of the printed page from the fuser more difficult.

Japanese Laid Open Application 7-199700, Canon K. K., filed December, 1993, describes a fusing belt for use in an electrophotographic process which is said to prevent charge accumulation on the belt. The belt comprises an insulating substrate, a conductive primer layer, and a high resistance release layer, such as the fluororesin PTFE with silica particles dispersed in it.

U.S. Pat. No. 4,179,601, Tarumi, et. al., issued Dec. 18, 1979, describes a fixing (fusing) apparatus for an electrophotographic process which reduces the level of electric charge on the fixing roll surface. The fixing roll and/or press roll in this device is taught to have an outer layer comprised of a resinous material with a low electric resistance powder incorporated therein (such as the fluororesin PTFE having carbon black and titanium dioxide incorporated therein).

U.S. Pat. No. 4,434,355, Inigaki, et. al., issued Feb. 28, 1984, describes a heat fixing device for use in an electrophotographic process which is said to inhibit toner offset. The heat fixing roll described includes an outer layer comprised of a fluororesin (such as PTFE, PFA or FEP) containing from 9% to 25% of carbon fibers.

U.S. Pat. No. 4,550,243, Inagaki, issued Oct. 29, 1985, also describes a heat roll fixing device for use in an electrophotographic process which is taught to inhibit toner offset. The roller comprises an electrically conductive core which carries a primer layer containing particulate carbon black with a fluororesin layer on top of it; the primer layer is partially exposed at the surface of fluororesin layer. The charges produced on the surface of the fluororesin layer are released by grounding through the primer layer and the conductive core. See also U.S. Pat. No. 4,596,920, Inagaki, issued Jun. 24, 1986.

U.S. Pat. No. 5,045,891, Semba, et. al., issued Sep. 23, 1991, describes an image fixing apparatus which is said to inhibit toner offset. The heating roll comprises an electrically conductive core which carries a fluororesin layer (such as PFA or PTFE) which includes 3% to 20% of a low resistance single crystal fiber, such as potassium titanate, silicon carbide, or carbon. These fibers are said to form conductive paths from the surface of the roll to the conductive core which acts to discharge any surface charge formed.

Until now, the electrical breakdown characteristics of the fuser roll or belt has not been used as a primary criterion for formulating a roll or belt which minimizes toner offset. It has now been found that if a fuser roll or belt is formulated such that it exhibits electrical breakdown at 250 volts or less, the toner offset contamination problem associated with charge accumulation on the fuser belt or roll is eliminated. Further, it is possible to formulate such a roll or belt with no particulate material in the outer layer thereby improving the release characteristics in the printing process.

SUMMARY OF THE INVENTION

The present invention encompasses a heat roll fixing device for use in an electrophotographic process, comprising a core member having coated thereon a plurality of concentric layers, wherein at least one of those layers does not contain an electrically conductive material and wherein the roll itself exhibits electrical breakdown at about 250 volts or less. In preferred hot rolls, the topcoat or release layer does not contain any electrically conductive materials.

The present invention also encompasses a fuser belt for use in an electrophotographic heat fixing process, comprising a heat resistant resin substrate in the form of a continuous belt carrying thereon a plurality of layers sequentially coating the outer surface of said belt, wherein at least one of said layers does not contain electrically conductive materials and wherein the belt exhibits electrical breakdown at about 250 volts or less. In preferred embodiments of this fuser belt, the topcoat or release layer does not contain any electrically conductive materials.

DETAILED DESCRIPTION OF THE INVENTION

Figure 1:
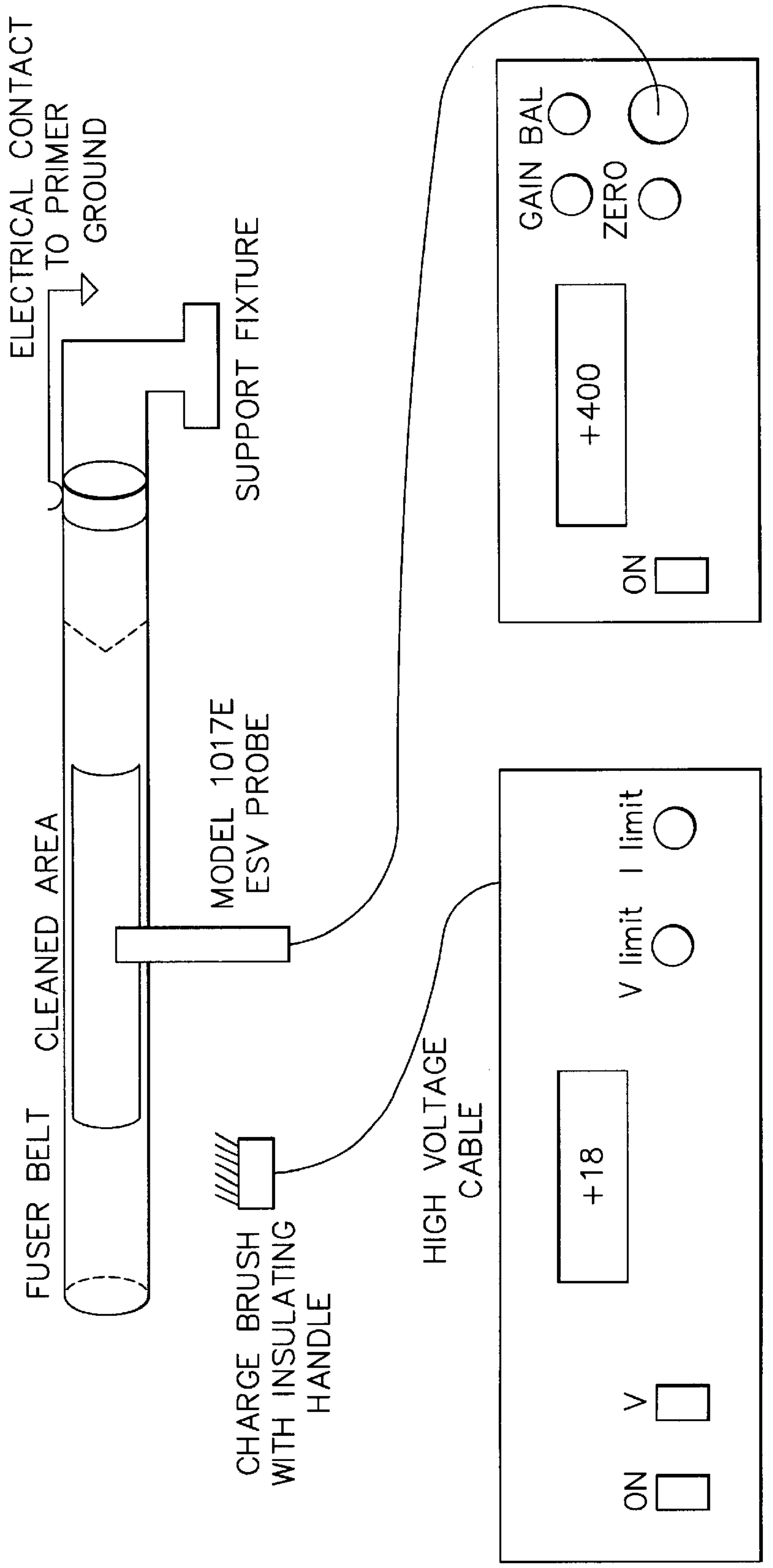
FIG. 1 is a schematic diagram of a test fixture which can be used to determine fuser belt or roll dielectric breakdown voltage and time constant.

The present invention relates to hot fuser rolls and fuser belts which are used in the fixing portion of the electrophotographic process. Specifically, the present invention recognizes the importance of the dielectric breakdown (or charge acceptance) value of a hot roll or a fuser belt coating in order to limit the build-up of charge on the fuser members, rather than (as the prior art does) focussing on the resistivity of the rollers or belts. This approach limits field magnitude and toner contamination associated with fuser electrostatics without requiring that each and every layer of the roller or belt be rendered resistive by the addition of conductive particles, fibers, or ionic additives. This provides much greater flexibility in the formulation of fuser hot rolls and fuser belts and, importantly, allows such rolls and belts to be formulated without particulate material in the topcoat or release layer, thereby improving the release properties of the printed pages from the fuser system.

The present invention is based on the finding that hot rolls and belts, which exhibit electrical breakdown at 250 volts or less (as applied with a corona and measured with an electrostatic probe), eliminate a particular toner contamination problem associated with charge accumulation on the fuser belt or hot roll. The distinction between a resistive coating and a coating that exhibits dielectric breakdown is an important one, since lower loadings of electrically conductive particles or ionic conductive agents in thick fluororesin layers or thin fluororesin coatings with no conductive particles or ionic conductive agents can be used to achieve a total composite coating electrical breakdown in the range of 250 volts or less. Functionally, the release characteristics of the fluoropolymer coating are significantly improved when conductive agents are reduced in concentration or eliminated.

The fuser hot rolls of the present invention comprise a core member, generally cylindrical in shape having laminated (coated) thereon a plurality of concentric layers which provide various functions. The core members are well known in the art and can be made from any material that conducts heat. Examples of such materials include aluminum, copper, aluminum alloys, copper alloys, steel and stainless steel. Aluminum is a preferred material because it is light in weight, heat conductive and relatively inexpensive. The core member is generally hollow, which permits a heating lamp to be placed within it thereby providing the heat energy to the fuser roll. The core is coated by two or more layers which entirely coat the outer surface of the core material. These layers provide the appropriate surface characteristics for the hot fuser roll, are sufficiently heat resistant to withstand fuser temperatures (e.g., 180° C.), and (alone and in combination with conductive materials) provide the required electrical breakdown characteristics of the roller. The total thickness of the surface layers is preferably in the range of from about 1 to about 50 $\mu$m. Examples of materials which can be used in the surface layers include fluorine-containing resins, polyimide resins, polyamidoimide resins, silicone resins, polybenzimidazol resins, polyphenylene oxide resins and polybutylene terephthalate resins. Fluorine-containing resins are preferred. Examples of fluorine-containing resins include polytetrafluoroethylene (PTFE), tetrafluoroethylene-perfluoroakylvinyl ether co-polymer (PFA), and tetrafluoroethylene-hexafluoropropylene co-polymer (FEP). Key to the present invention is that at least one of the coated layers does not contain electrically conductive materials and that the roll itself exhibits electrical breakdown at about 250 volts or less.

In a preferred embodiment, the hot roll comprises a core member, a primer layer coating said core, an intermediate layer coating said primer layer, and a topcoat (release) layer coating said intermediate layer. In a particularly preferred embodiment, the topcoat (release) layer does not contain any electrically conductive materials. The primer and intermediate layers are preferably formed from fluoropolymers, such as those described above, containing electrically conductive materials, such as carbon black and the ionic conductive materials described in U.S. Pat. No. 5,697,037, Yano, et. al., issued Dec. 9, 1997, incorporated herein by reference. In preferred structures, the primary and intermediate layers contained from about 1% to about 10% of the conductive materials based upon the weight of the fluoropolymer. The primer layer generally has a thickness of from about 1 to about 13 $\mu$m, preferably from about 2 to about 5 $\mu$m; the intermediate layer has a thickness of from about 15 to about 30 $\mu$m, preferably from about 18 to about 22 $\mu$m; and the topcoat or release layer generally has a thickness of from about 1 to about 7 $\mu$m, preferably from about 2 to about 3 $\mu$m.

The fuser belts of the present invention generally comprise a heat resistant resin substrate in the form of a continuous belt carrying thereon a plurality of layers sequentially coating the outer surface of the belt. The film for the fuser belt is typically a heat resistant film such as a polyimide, polyamide or polyphenylene oxide. A preferred belt is a polyimide seamless film which can be obtained, for example, by casting onto the surface of a cylinder a polyimide precursor obtained by reacting an aromatic tetracarboxylic acid component with an aromatic diamine component in an organic polar solvent, thermally treating the cast material, and then subjecting the treated material to a dehydration-condensation reaction.

The layers which are included on the belt act to modify the surface of the belt in a manner required to permit it to act as an effective fuser belt. The layers utilized are those which have appropriate adhesion properties for the belt itself, are sufficiently heat resistant to withstand fuser temperatures, provide the desired release characteristics for the printed page and, either alone or in combination with conductive materials, provide a belt which exhibits electrical breakdown at about 250 volts or less. A key aspect of the present invention is that at least one of said layers does not contain an electrically conductive material. The total thickness of the surface layer is preferably in the range of from about 1 to about 50 $\mu$m. Examples of materials which can be used for such layers include fluorine-containing resins, polyimide resins, polyamidoimide resins, silicone resins, polybenzimidazol resins, polyphenylene oxide resins and polybutylene terephthalate resins. Fluorine-containing resins are most preferred. Examples of suitable fluorine-containing resins include polytetrafluoroethylene (PTFE), tetrafluoroethylene-perfluoroakylvinyl ether co-polymer (PFA), and tetrafluoroethylene-hexafluoropropylene co-polymer (FEP).

Preferred belt structures incorporate a polyimide resin for the belt and a primer layer, an intermediate layer and a topcoat (release) layer, with the primer layer coating directly on the outer surface of the belt, the intermediate layer coating the primer layer and the topcoat (release) layer coating the intermediate layer. In preferred embodiments, the topcoat or release layer does not contain any electrically conductive materials. In preferred embodiments, the primer and intermediate layers comprise a fluoropolymer with conductive materials, such as carbon black or the ionic conductive additives described in U.S. Pat. No. 5,697,037, Yano, et. al., issued Dec. 9, 1997, incorporated herein by reference. The conductive materials are preferably present at from about 5% to about 30% based on fluoropolymer content in the primer layer, and from about 1% to about 5% based on fluoropolymer content in the intermediate layer. The belt may also contain an amount of a thermally conductive material, such as boron nitride, preferably in an amount of from about 15% to about 30% based on the polyimide content of the belt. The polyimide belt generally has a thickness of from about 30 $\mu$m to about 60 $\mu$m, preferably from about 45 $\mu$m to about 55 $\mu$m; the primer layer has a thickness of from about 1 $\mu$m to about 10 $\mu$m, preferably from about 2 $\mu$m to about 5 $\mu$m; the intermediate layer has a thickness of from about 5 $\mu$m to about 20 $\mu$m, preferably from about 8 $\mu$m to about 12 $\mu$m; and the topcoat (release) layer has a thickness of from about 2 $\mu$m to about 5 $\mu$m, preferably from about 2 $\mu$m to about 3 $\mu$m.

Characterization of insulators in terms of voltage or dielectric breakdown and resistivity is well known in the wire industry. A fluoropolymer resin, for instance, polytetrafluoroethylene (PTFE), is characterized in terms of its dielectric breakdown voltage of 60 to 80 volts per micron and resistivity of greater than 1E18ohm-cm. Another fluoropolymer, fluorinated ethylene propylene (FEP), is characterized as having a dielectric breakdown voltage of 80 volts per micron and a resistivity of greater than 1E18ohm-cm. The distinction between breakdown voltage and resistivity should be noted (data from *Plastics for Engineers,* Hans Domininghaus, Hanser Publishers, New York, 1988).

Characterization of materials in terms of dielectric breakdown and resistivity is also well known in electrophotography. For instance, photoconductors are characterized by charge acceptance (i.e., the voltage at which a photoconductor film of a given thickness (in the dark) no longer increases in voltage when provided with a source of charge of a corotron or charge roll). This is directly related to the dielectric breakdown voltage. The film resistivity, r, is characterized by the measured charge decay time (also assessed in the dark) where the measured time constant time, T, is given by T(sec)=r (ohm-cm)×K$\epsilon$o(farad/cm). In this equation, K is the relative dielectric constant of the film and $\epsilon$o is the permitivity of free space (8.854E-14 farad/cm).

A fixture procedure for assessing the dielectric breakdown voltage and time constant for a fuser belt or roll is shown in FIG. 1. The test procedure utilized is as follows:

(1) Clean the belt or roll surface in a 3×10 cm area where the measurement is to be made. Wipe with a clean-room wipe that has been moistened with isopropyl alcohol. Wipe dry, then air dry 30 seconds.

(2) Place the belt on the mandrel of the test fixture. Provide a ground to the primer layer of belt (or hot roll core).

(3) Position the Monroe ESV probe for ready placement 1 to 1.5 mm from the component being tested.

(4) Move the probe aside. Turn on +20 $\mu$A, 0 to 10 OKV Monroe Corona Ply II with the Charge Brush in hand.

(5) Lightly drag the Charge Brush across the surface of the fuser belt (or roll), making 3 passes over the 3×10 cm area. Then, make three additional charging passes with the Charge Brush 2 to 4 mm from the surface of the belt (or roll).

(6) Shut off the Corona Ply II and immediately reposition the ESV probe 1 to 1.5 mm from the center of the charged area.

(7) Record the voltage at 3 seconds as "V3".

(8) Record the voltage at 30 seconds as "V30".

Figure 2:
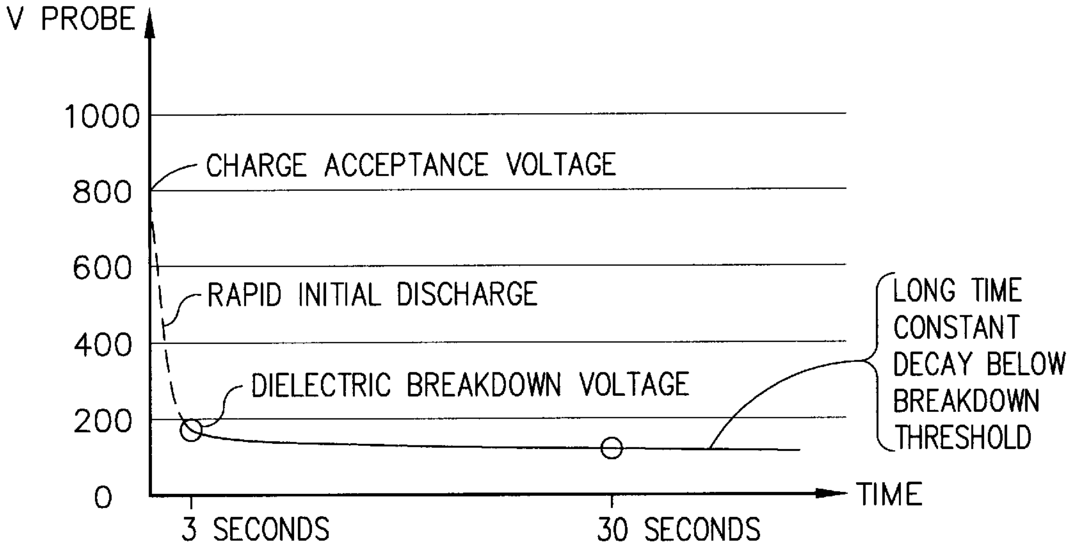
FIG. 2 is a graph of typical results obtained using the test fixture shown in FIG. 1.

The result of charging a fuser belt with the Charge Brush and monitoring the voltage on its surface after removing the charge source is shown in FIG. 2. Here the dielectric breakdown voltage of the composite coated belt is defined as V3, the voltage measured at 3 seconds after the 20 $\mu$A Charge Brush is removed. The time constant, T=27/ln (V3/V30).

An unfilled PTFE fluoropolymer outer layer breaks down at approximately 80 volts per micron resulting in 960 volt dielectric breakdown voltage for a 12 $\mu$m thick coating layer. Reducing the thickness to 6 $\mu$m would be expected to reduce the dielectric breakdown voltage to approximately 480 volts. Further reducing the thickness to 2 $\mu$m would be expected to reduce the dielectric breakdown voltage to about 160 volts.

By adding carbon particles to the fluororesin coating, the effective insulation thickness can be reduced substantially (depending on loading) to achieve a 40 to 200 volt breakdown for the same 12 $\mu$m thick PTFE coating. The measured time constant, illustrated in FIG. 2, is unchanged, indicating that it is the breakdown voltage and not the coating resistivity that has been reduced by the carbon loading. The coating resistivity is that of the PTFE (very high) once the surface potential is below the insulation breakdown voltage.

The fuser rolls and fuser belts of the present invention are illustrated by the following examples, which are intended to be illustrative and not limiting thereof.

EXAMPLE 1

A fuser belt of the present invention has the following composition:

1. 50 μm polyimide base layer loaded with boron nitride at 15% to 30% by weight.
2. 3 μm conductive primer layer made from DuPont 855-029 (a dispersion containing a PTFE/FEP blend with conductive carbon black).
3. 10 μm fluoropolymer dielectric breakdown layer made of DuPont 855-411 (a dispersion containing PFA and approximately 3.8% carbon black) mixed with DuPont 857-210 (a dispersion containing PFA) in the ratio 40:60 to yield a coating with approximately 1.5% carbon black.
4. 2 μm fluoropolymer top layer made from DuPont 857-210 with no electrically conductive additive present.

The fuser belt is made as follows:

A seamless polyimide tube (25.4 mm diameter) is used as the coating substrate. The polyimide is a biphenyl-3,3',4,4'-tetracarboxylic dianhydride/ p-phenylene diamine(BPDA/PDA) type loaded with boron nitride. The tube is placed on an anodized aluminum mandrel. It is tapered on one end to help hold the tube in place when the mandrel is rotated. A gravity fed air spray gun, Iwata model RG-2, is mounted on a fixture that is translated left and right by means of a turning spindle. The tube with the mandrel is mounted within 150 to 200 mm from the tip of the gun.

The DuPont 855-029 primer is slowly rotated to mix, then is filtered through a 50 micron nylon bag. The dispersion is diluted to 20% solids with a 1% aqueous solution of Union Carbide Triton™ X-100 surfactant. The gun flow rate is set at 0.0125 gms/sec and atomization pressure at 40 psi. The primer is sprayed in 2 passes in one direction at a rate of 3.0 cm/sec and a mandrel rotation of 120 rpm.

DuPont 855-411 and 857-210 are slowly rotated to mix. 40 gms of 855-411 are added to 60 gms of 857-210. This mixture is slowly rotated to mix, then filtered through a 100 micron nylon bag. A mask is used to leave exposed primer on one end of the belt. The gun flow rate is set at 0.0362 gms/sec and atomization pressure at 60 psi. The dielectric breakdown layer is sprayed in 3 passes in one direction at a rate of 3.0 cm/sec and a mandrel rotation of 120 rpm.

The DuPont 857-210 topcoat is slowly rotated to mix, then is filtered through a 100 micron nylon bag. The dispersion is diluted to 25% solids with a 1% aqueous solution of Union Carbide Triton™ X-100 surfactant. The gun flow rate is set at 0.0362 gms/sec and atomization pressure at 60 psi. The topcoat is sprayed in 1 pass at a rate of 3.0 cm/sec and a mandrel rotation of 120 rpm. The tube is then dried at 200° C. for 10 minutes and sintered at 380° C. for 2 hours. The tube is trimmed on a lathe to leave an exposed topcoat layer.

EXAMPLE 2

A fuser belt of the present invention, having the composition set forth below, is made according to the method described in Example 1.

1. 50 μm polyimide base layer loaded with boron nitride at 15%–30% by weight.
2. 3 μm conductive primer layer made from fluoropolymer DuPont 855-029 (a dispersion containing a PTFE/FEP blend with conductive carbon black).
3. 10 μm fluoropolymer dielectric breakdown layer made from DuPont 857-210 PFA, with an ionic conductive additive of the type described in U.S. Pat. No. 5,697,037.
4. 2 μm fluoropolymer top layer made from DuPont 857-210 with no electrically conductive additive present.

EXAMPLE 3

A fuser hot roll of the present invention comprises the following components:

1. An aluminum core roughened to approximately 3 μm Ra.
2. 3 μm conductive primer layer made from DuPont 855-029 (a dispersion containing a PTFE/FEP blend with conductive carbon black).
3. 20 μm fluoropolymer dielectric breakdown layer made from DuPont 855-411 (a dispersion containing PFA at approximately 3.8% carbon black) mixed with DuPont 857-210 (a dispersion containing PFA) in a 40:60 ratio to yield a coating with approximately 1.5% carbon black.
4. 2 μm fluoropolymer top layer made from DuPont 857-210 with no electrically conductive additive present.

The fuser hot roll is made using the following procedure: An aluminum tube, which has been grit blasted to an average roughness of 3.5 microns is used as the core. The coating process is the same as that described in Example 1 except that 6 passes are used for the dielectric breakdown layer and the coating speed is adjusted when the diameter of the tube is different from Example 1.

EXAMPLE 4

Using the procedure described in Example 3 above, a fuser hot roll having the components described below is made.

1. An aluminum core roughened to approximately 3 μm Ra.
2. 3 μm conductive primer layer made from DuPont 855-029 (a dispersion containing a PTFE/FEP blend with conductive carbon black).
3. 20 μm fluoropolymer dielectric breakdown layer made of DuPont 857-210 PFA with an ionic conductive additive of the type described in U.S. Pat. No. 5,697,037.
4. 2 μm fluoropolymer top layer made from DuPont 857-210 with no electrically conductive additive present.

EXAMPLE 5

A carbon black loading and film thickness study was performed. The compositions tested and the results obtained are shown in the following table and in FIG. 3.

| Run # | Typ Thickness | Typ Volt @ 3 sec | Coating Mixture | Mixture Ratio | Coating Thickness (μm) | Voltage @ 3 secs |
|---|---|---|---|---|---|---|
| 1 | 5 | 65 | 857-210/855-411 | 75/25 | 5 | 55–75 |
| 2 | 7 | 155 | 857-210/855-411 | 75/25 | 7 | 140–170 |
| 3 | 10 | 180 | 857-210/855-411 | 75/25 | 10 | 170–190 |
| 4 | 18.5 | 450 | 857-210/855-411 | 75/25 | 17–20 | 400–500 |
| 5 | 8.5 | 85 | 857-210/855-411 | 60/40 | 7–10 | 70–100 |
| 6 | 25 | 110 | 857-210/855-411 | 60/40 | 25 | 100–120 |
| 7 | 5 | 16 | 857-210/855-411 | 50/50 | 4–6 | 15–17 |
| 8 | 25 | 13 | 857-210/855-411 | 50/50 | 25 | 11–15 |

Figure 3:
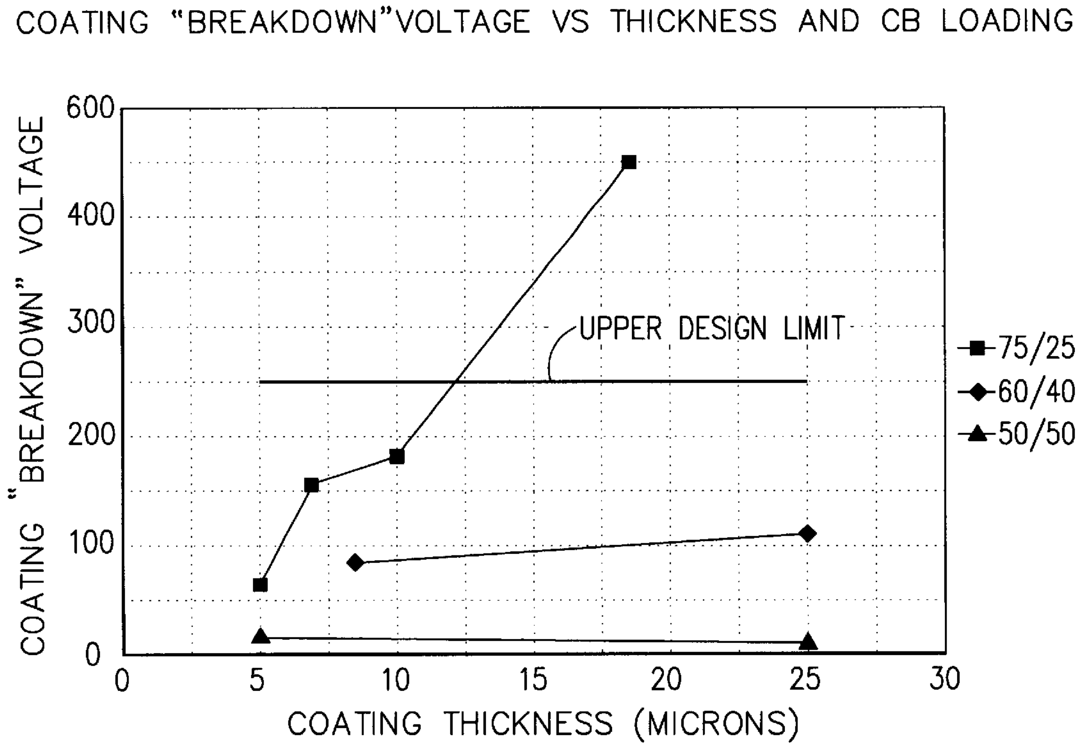
FIG. 3 is a graph showing measured dielectric breakdown voltage versus coating thickness and carbon loading of the outer layer for fuser belts exemplified in the present application.

Films were made using a series of mixture ratios of the unfilled DuPont 857-210 PFA and the DuPont 855-411, carbon black loaded PFA (at approximately 3.8% carbon black by weight) fluoropolymers. FIG. 3 illustrates the anticipated effects of both carbon black loading and film thickness on the dielectric breakdown voltage measurement. A separate functional test showed that belts having a dielectric breakdown voltage of 250 volts or less did not exhibit toner offset contamination. The 250 volt threshold voltage corresponding to the onset of this contamination effect is also shown in FIG. 3. The preferred operating range is below the threshold line.

A second study was conducted on four layer fuser belts. Measurements of breakdown voltage for three experimental, four layer fuser belt samples constructed with a conductive primer layer, a dielectric breakdown layer with carbon black loading, and unfilled topcoat are shown in the following table. Here, as expected, belt sample #3, with a 2 μm topcoat met the desired<250 volt dielectric breakdown voltage target. Belts with thicker topcoats exceeded the 250 volt dielectric breakdown target.

| 4-Layer Fuser Belts | Coating Material | #1 | #2 | #3 |
|---|---|---|---|---|
| Primer: | 855–029 | 3μm | 2–3μm | 3μm |
| Midcoat: | 855–101 | 6 | 7–9 | 10 |
| Topcoat: | 857–210 | 6 | 3–5 | 2 |
| Measured Breakdown Voltage: | | 270–415V | 215–290V | 195–230V |

The coating materials used are as follows:

Dupont 855-029(a dispersion containing a PTFE/FEP blend with conductive carbon black)

Dupont 855-101 (a dispersion containing a PTFE/FEP blend with carbon black)

Dupont 857-210(a dispersion containing PTF)

what is claimed is:

1. A heat roller fixing device for use in electrophotography comprising a core member having coated thereon a plurality of concentric layers, said layers comprising a primer layer on said core, an intermediate layer on said primer layer, and a topcoat layer on said intermediate layer, wherein the topcoat layer does not contain electrically-conductive materials and has a thickness of from about 1 to about 7 μm and wherein the roll exhibits electrical breakdown at about 250 volts or less.

2. A heat roller according to claim 1 wherein the primer and intermediate layers comprise a fluoropolymer containing electrically-conductive materials.

3. A heat roll according to claim 2 wherein the electrically conductive material is selected from the group consisting of carbon black, ionic conductive additives, and mixtures thereof.

4. A heat roller according to claim 3 wherein the electrically-conductive material is present at from about 1% to about 10%, based on the weight of the fluoropolymer in each layer.

5. A heat roll according to claim 3 Wherein the primer layer has a thickness of from about 1 to about 13 μm and the intermediate layer has a thickness of from about 15 to about 30 μm.

6. A heat roll according to claim 5 wherein the primer layer has a thickness of from about 2 to about 5 μm, the intermediate layer has a thickness of from about 18 to about 22 μm, and the topcoat layer has a thickness of from about 2 to about 3 μm.

7. A heat roll according to claim 6 wherein the core member is made from aluminum.

* * * * *